(12) United States Patent
Remollino

(10) Patent No.: US 8,745,593 B2
(45) Date of Patent: Jun. 3, 2014

(54) PROCESS FOR VERIFYING COMPUTER CODES AND CORRESPONDING VERIFICATION SYSTEM

(76) Inventor: Antonio Remollino, Muro Lucano (IT)

( * ) Notice: Subject to any disclaimer, the term of this patent is extended or adjusted under 35 U.S.C. 154(b) by 812 days.

(21) Appl. No.: 12/808,719

(22) PCT Filed: Dec. 17, 2008

(86) PCT No.: PCT/IB2008/003585
§ 371 (c)(1),
(2), (4) Date: Jun. 17, 2010

(87) PCT Pub. No.: WO2009/081267
PCT Pub. Date: Jul. 2, 2009

(65) Prior Publication Data
US 2010/0281466 A1    Nov. 4, 2010

(30) Foreign Application Priority Data
Dec. 19, 2007  (IT) .............................. TO2007A0915

(51) Int. Cl.
*G06F 9/44* (2006.01)
(52) U.S. Cl.
USPC ............................ 717/126; 717/125; 717/131
(58) Field of Classification Search
USPC ............................ 717/124–135; 709/220–231
See application file for complete search history.

(56) References Cited

U.S. PATENT DOCUMENTS

| | | | | |
|---|---|---|---|---|
| 5,963,739 A * | 10/1999 | Homeier | ................. | 717/126 |
| 6,560,774 B1 * | 5/2003 | Gordon et al. | ................. | 717/146 |
| 7,010,779 B2 * | 3/2006 | Rubin et al. | ................. | 717/106 |
| 2004/0083464 A1 * | 4/2004 | Cwalina et al. | ................. | 717/141 |
| 2004/0133445 A1 * | 7/2004 | Rajan et al. | ................. | 705/1 |
| 2006/0020574 A1 * | 1/2006 | Moona et al. | ................. | 707/2 |
| 2006/0150160 A1 * | 7/2006 | Taft et al. | ................. | 717/126 |
| 2007/0006154 A1 | 1/2007 | Yang et al. | | |
| 2007/0168911 A1 * | 7/2007 | Takashima et al. | ................. | 717/101 |
| 2007/0291703 A1 * | 12/2007 | Muller | ................. | 370/338 |
| 2007/0300210 A1 * | 12/2007 | Haraguchi | ................. | 717/136 |
| 2008/0282229 A1 * | 11/2008 | Kim et al. | ................. | 717/124 |
| 2010/0058276 A1 * | 3/2010 | Felder et al. | ................. | 716/17 |
| 2011/0010691 A1 * | 1/2011 | Lu et al. | ................. | 717/124 |

OTHER PUBLICATIONS

Patil et al., "Low-cost, Concurrent Checking of Pointer and Array Accesses in C Programs", Jun. 6, 1996, pp. 1-32.*
Lars Ole Anderson, "Program Analysis and Specialization for the C Programming Language", May 1994, pp. 1-297.*

(Continued)

*Primary Examiner* — Satish Rampuria
(74) *Attorney, Agent, or Firm* — Nixon & Vanderhye P.C.

(57) ABSTRACT

A process for detecting errors in computer code in C/C++ language in a computer, which comprises the operations of: —making available in said computer a source computer program (P) containing computer codes in C/C++ language; compiling (Z) said source computer program (P) to obtain an executable program (E); and —executing (240) said executable program (E) to generate (245) an error report (R). According to the invention, said method comprises, prior to the operation of compilation (Z): executing an operation of syntactic analysis (AS) to identify variables (x) having a structure of vector or pointer; modifying said source computer program (P) via the application to said identified variables (x) of a test function (f ( . . . ); io_sper; io_sper2; io_sper3; io_sper4) that is able to veriCy, during the operation of execution, whether an index (y) supplied for said variable x is valid.

31 Claims, 3 Drawing Sheets

(56) References Cited

OTHER PUBLICATIONS

Greg McGary, "Re: array bounds checking?", GCC project, May 3, 1998, pp. 1-12.*
Jones et al., "A Bounds Checking C Compiler", May & Jun. 1995, pp. 1-65.*
SiCrane, How to find the length of an array in C/C++?, Aug. 2005, p. 1-2.*
International Search Report for PCT/IB2008/003585, mailed Sep. 8, 2009.
Written Opinion for PCT/IB2008/003585, mailed Sep. 8, 2009.
Patil et al., "Low-Cost, Concurrent Checking of Pointer and Array Accesses in C Programs", *Software Practice & Experience, Wiley & Sons*, vol. 27, No. 1, Jan. 1997, pp. 87-110, XP000655618.
Edelson, "Smart Pointers; they're smart, but they're not pointers", *USENIX C++ Technical Conference*, Aug. 1992, pp. 1-19, XP002266473.
Gamma et al., "Design Patters, Elements of Reusable Object-Oriented Sotware, Visitor Pattern, PASSAGE", *Design Patterns*, Apr. 2005, pp. 207-217, XP002543513.
Dahn et al., "Using program transformation to secure C programs against buffer overflows", *Working Conf. on Reverse Engineering*, Nov. 2003, pp. 323-332, XP010697548.
Kowshik et al., "Ensuring code safety without runtime checks for real-time control systems", *ACM*, 2002, pp. 288-297, XP040140047.
Chinchani et al., "ARCHERR: runtime environment driven program safety", *Computer Security—ESORICS*, 2004, pp. 385-406, XP002543518.

* cited by examiner

PROCESS FOR VERIFYING COMPUTER CODES AND CORRESPONDING VERIFICATION SYSTEM

This application is the U.S. national phase of International Application No. PCT/IB2008/003585 filed 17 Dec. 2008 which designated the U.S. and claims priority to IT Patent Application No. TO2007A000915 filed 19 Dec. 2007, the entire contents of each of which are hereby incorporated by reference.

FIELD OF THE INVENTION

The present invention relates to techniques for verifying computer codes, specifically computer codes in C and C++ language. In the present description, direct reference will be made to instructions and functions of said languages, as is known, for example, from the standard of the C language (ISO 9899) and of the C++ language (ISO/IEC14882:1998 "Information Technology—Programming Languages—C++", updated in 2003).

Specifically, the invention regards techniques for verifying errors during run-time of a computer program, with particular attention paid to the identification of vector buffer-overflow errors.

The invention has been developed with particular attention paid to its possible use in computer programs of an embedded type, for motor-vehicle control units, even though other applications are possible for the process and system proposed.

DESCRIPTION OF THE KNOWN ART

The production of computer products, such as computer programs, envisages editing of the computer programs in the language chosen, normally a high-level language, such as C or C++ language, but also envisages subjecting the program obtained to tests on operation, such as procedures of verification (testing) and procedures of removal of errors (debugging). Said tests on operation account for a non-indifferent portion of the resources and of the time used for the production of the computer program.

The normal procedures for testing the computer program conducted in a classic way consist in displaying, in the development environment, the behaviour and possible errors, but this does not enable tests to be conducted with high coverage of the possible cases of error. This occurs chiefly both on account of the limited capacities of the development environment for discovering run-time errors, i.e., in the period of execution of the program, and, in the case of step-by-step debugging by the developer of the computer program, on account of the impossibility of testing a sufficiently high number of cases. There derives therefrom the growing need to develop procedures of verification of the computer program during run-time.

The buffer-overflow error, i.e, the anomalous condition during which a process tries to store data beyond the limits of a buffer of fixed length, for example, using an index beyond the maximum index of a vector variable, is one of the main problems that arise during running of computer programs, both for problems of security, in so far as the buffer-overflow technique can be employed to overcome the security systems, and for problems that arise during running of the programs.

In C/C++ languages, said problem is particularly felt in so far as in said languages no check is envisaged on the indices, nor do the compilers make checks on said indices, other than in a mild way.

Known on the market are programs that execute procedures capable of identifying said errors partially, but they fail in the case of multiple vectors, of which they are able to verify only the buffer overflow on the entire structure thereof (and not on each individual index).

This occurs, for example, in the case of three-dimensional vectors, when, for example, the updating operation updates the contents of an element internal to the vector.

Another problem arises in the structures when, for example, writing occurs within the structure.

Also known are programs that carry out a test on the memory, to make a check during execution (run-time checking), but also these have a limited capacity for detecting buffer-overflow errors.

The computer-program product Valgrind is an example of such programs, which, however, is not able to verify the stack memory.

The computer-program product Rational Purify produced by IBM envisages inserting guard zones around each variable in the data-state area of the program, notifying an error if the program tries to read or write in said guard zones. Such product Purify, however, requires the user to check the sizes of the guard zones, which are in any case assigned with low flexibility and selectivity, to obtain good results and is not, in any case, able to operate properly if all the data references are not with known variables. The program Purify uses the technique of insertion of additional memory around the variables. If writing is performed in said memory area, the overflow error is detected; if, instead, said area (containing the additional memory) is exceeded, nothing is detected.

In addition, Purify makes the check on the structures as a whole and not on the internal parts thereof. Since said program is integrated in the development environment (for example, Visual C++), it is possible to execute just a single instance of execution of the program.

The computer-program product Codeguard, associated to the Borland C++ compiler, requires installation of a dynamic-link library (DLL) cg32.dll, which is recalled during run-time. This enables creation of an executable program of an autonomous, i.e., stand-alone, type, but operating only in the Windows environment.

The product Codeguard presents the same disadvantages al Purify in so far as it is able to identify only errors on the structure as a whole.

Hence, the solutions available in the state of the art present numerous drawbacks and limitations when it is a matter of subjecting to verification vectors in C/C++ language codes and to detection of errors.

OBJECT AND SUMMARY OF THE INVENTION

The object of the present invention is to provide a solution that will enable verification of C/C++ language codes and detection of errors, making the check on buffer overflow also in the case of vectors (whether one-dimensional or multidimensional ones) defined in the stack, and in the case of vectors contained in structures, maintaining the greatest possible independence from the compiler and the operating system used.

In accordance with the present invention, this object is achieved by means of a process having the characteristics recalled in the annexed claims. The present invention also regards a corresponding system, as well as a computer-program product loadable into the memory of at least one computer and comprising software code portions for performing the aforesaid process. As used herein, the reference to such a computer-program product is understood as equivalent to the reference to a computer-readable means containing instructions for controlling a computer system in order to co-ordinate execution of the process according to the invention. The reference to "at least one computer" is intended to highlight the possibility of the present invention being implemented in a distributed and/or modular way.

The claims form an integral part of the description of the invention provided herein.

BRIEF DESCRIPTION OF THE DRAWINGS

The invention will now be described, by way of non limiting example, with reference to the figures of the annexed drawings, wherein.

DETAILED DESCRIPTION OF EXAMPLES OF EMBODIMENT OF THE INVENTION

Basically, the solution described herein usually fits within the framework of the process of creation of a computer-program product run totally or partially on a computer, where there are envisaged: steps that comprise editing of portions of source code in C/C++ languages by means of data-input peripherals of the computer; steps of compilation of the portions of source code in lower-level language through microprocessor means and volatile-memory or mass-memory means of the computer; steps of verification of the compiled code through microprocessor means and volatile-memory or mass-memory means of the computer; and steps of generation of a corresponding error report made available to the user via output peripherals of the computer in particular display peripherals or data-printing peripherals in order to introduce modifications in editing of the portion of source code subjected to compilation and hence lead to an optimization of the process of creation of the computer-program product. It is clear, among other things, that in said context in some cases parts or all of the operations of editing of the source code and/or of correction of the portions of code edited on the basis of the report generated can be performed not manually by operators/programmers, but in an automatic way by automatic code-generation software.

In such a framework, there is proposed a process of verification of computer codes based upon the syntax of C/C++ language, hence independent of the compiler and the operating system in the framework of which the process operates in so far as it basically envisages converting a source code into a further, more elaborate, source code. Said process is conceived both for applications of a user type and for applications of an embedded type (e.g., for control units of automobiles, aeroplanes, trains, cellphones, electric household appliances, etc.).

Figure 1:
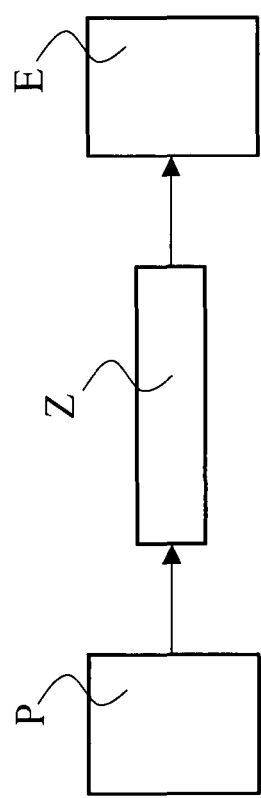
FIG. 1 shows a schematic block diagram illustrating a process of verification according to the known art.

Illustrated in FIG. 1 is a block diagram of the flow of a process of verification of computer codes according to the known art.

Designated by the reference P is a source computer program P in high-level language, specifically C language. Designated by the reference Z is a procedure of compilation of the computer program, via an appropriate compiler program, in an executable program E compiled in low-level language, for example, machine language.

Figure 2:
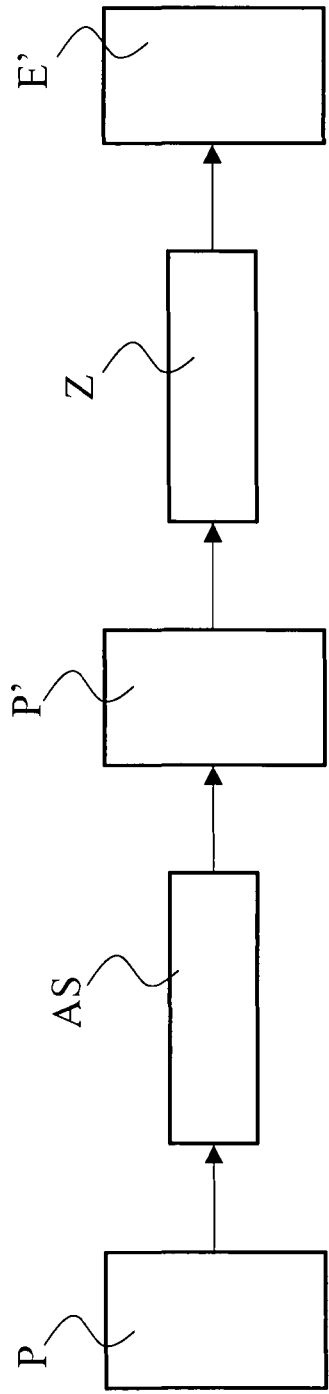
FIG. 2 shows a schematic block diagram illustrating a process of verification according to the invention.

FIG. 2 illustrates a block diagram of the flow of a process according to the invention, which presents a flow of operations modified with respect to the process illustrated in FIG. 1. In fact, the source computer program P in C language undergoes a process of syntactic analysis AS, i.e., a process that performs the so-called 'parsing' operation, performing a syntactic analysis of the sequences of instructions in the source computer program P for determining the grammatical structure thereof with respect to a given formal grammar. However, the process of syntactic analysis AS, moreover proceeds, following upon determination of the structure of the source program P according to the criteria that will be set forth hereinafter, to generate a modified source computer program P', once again in C language, which is supplied to the procedure of compilation Z to obtain a compiled modified executable program E'.

Consequently, the process of verification according to the invention is distinguished above all by the presence of the procedure of syntactic analysis AS, which determines the generation of a modified source computer program P'.

Figure 3:
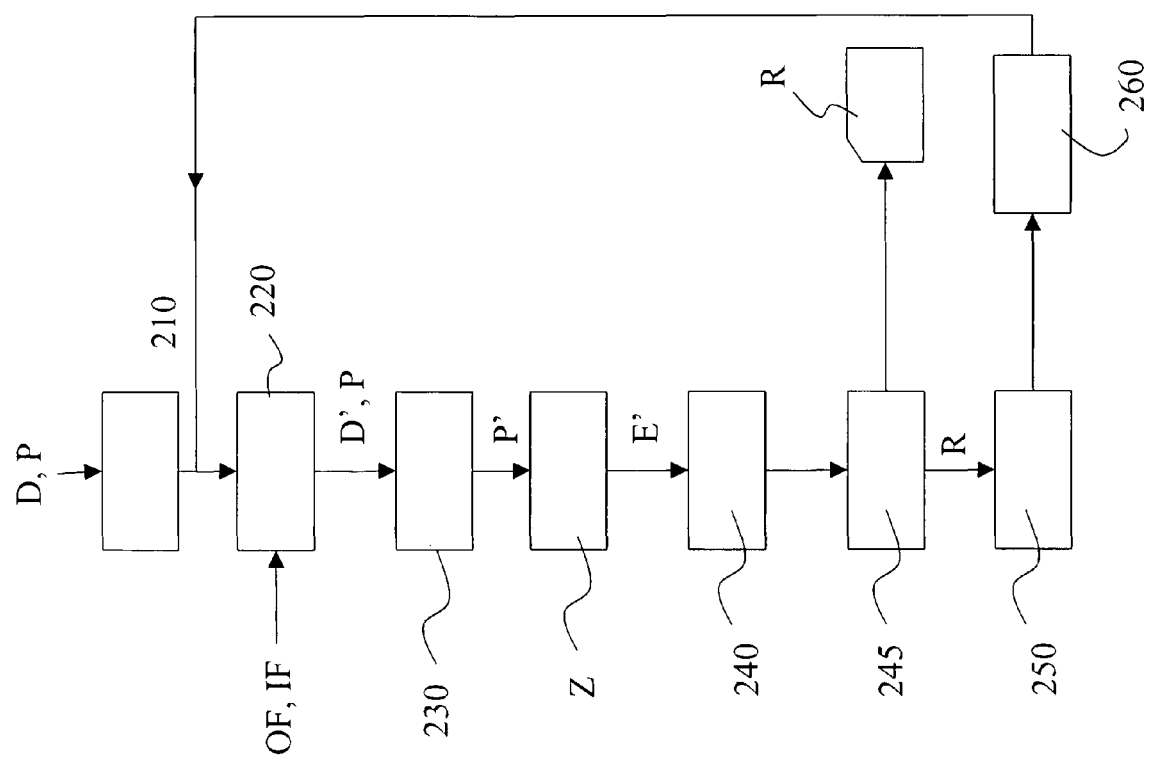
FIG. 3 shows a flowchart illustrating operations of the process of verification of FIG. 2.

The process of verification proposed basically executes the following operations, which can be run on at least one computer or microprocessor and is illustrated also with reference to a flowchart shown in FIG. 3, starting from a project D in C language that comprises the source computer program P:

an operation 210 of creation of a copy on the computer or on storage means connected thereto of said project D with the corresponding source codes of the source program P to be subjected to verification;

an operation 220 of addition to the copy of the project D of an object file OF that contains the test functions to be introduced, resulting in the new project D'; the operation 220 also comprises inserting an interfacing module IF accessible to a programmer via, for example, the conventional data-input peripherals and display of the computer, for examination and correction of the errors;

an operation 230 of substitution of the codes of the source program P of the new project D' with codes created by the program of syntactic analysis AS starting from the source codes of the source program P;

the operation of compilation Z of the new project D to obtain the new executable program E', for example, in the volatile-memory or mass-memory means of the processor;

an operation 240 of start of execution of the executable program E, which determines an operation 245 of generation of report messages R, i.e., reports on errors, and an operation 250 of verification of said error report messages R, for example, addressed to the display peripheral of the computer;

an operation 260 of correction of the errors in the file of the original project D.

Next, the flow returns to the substitution step 230 if it is necessary to verify again the computer program.

In greater detail, the operation 220 of addition to the copy of the project D of an object file OF that contains the test functions to be introduced, resulting in the new project D', envisages adding to the new project D' the following files and the respective header files:

io_sper_functions.obj
io_sper_functions.h
ErrorFunctions.c
ErrorFunctions.h where: io_sper_functions.obj corresponds to the object file OF, associated to which is the header file io_sper_functions.h; ErrorFunctions.c, with the corresponding header file Error-Functions.h, corresponds, instead, to an interfacing module IF accessible to the programmer, which will be described in detail in what follows.

The procedure of syntactic analysis AS, comprised in the operation of substitution 230, basically subjects to testing in the source program P variables x of the source code that have a structure of variable of an x[y] type, where y is an index, i.e., a structure in which the variable x contains all the information involved in the test.

The processing executed by the procedure of syntactic analysis AS is of a local type; i.e., it is not necessary to have information regarding the use in the program P of said variable x. Hence, it is of no importance where said variable x has been defined or how it has been defined: at the moment when the procedure of syntactic analysis AS identifies a variable x of a vector type, identifiable in C language through the symbols denoting square brackets "[ . . . ]", it modifies said variable x and introduces therein a test function f( . . . ), which enables verification during run-time of whether an index y supplied for said variable x is valid.

The procedure of syntactic analysis AS proposed envisages for this reason conversion of the vector structure of an x[y] type into a structure x[f(y, x)]:

$$x[y] \rightarrow x[f(y,x)]$$

where f is the test function that verifies the validity of the index y and returns the index to be supplied to the vector.

The operations are encapsulated in the vector and are hence irrespective of the context in which the vector is inserted.

It should be noted that, since the variable x is a vector, assuming that the source program P (or rather a fragment thereof) has the following form:

```
ii = y;
while(x[ii] < 8)
   {
   ...
   ii = ii + rand( );
   }
``` a manual or automatic solution could envisage inserting control codelines in the source program P, modifying the code as follows:

```
ii = y;
len = sizeo(x)/ sizeo(x[0]);
if(ii < len)
   {
   while(x[ii] < 8)
      {
      ...
      ii = ii + rand( );
      if(ii >= len)
         {
         //signalling err
         Error( );
         }
      }
   }
```

Similar operations should be performed for the constructs "for", "switch", "do-while", "if", with all the possible particular cases. For this purpose, there should be developed an extremely elaborate procedure of syntactic analysis, hence difficult to implement and to manage.

The procedure of syntactic analysis AS of the process for verifying computer codes according to the invention envisages, instead, that the source program P will be modified as in the following example:

```
ii = y;
while(x[f(ii, x,...)] < 8)
   {
   ...
   ii = ii + rand( );
   }
```

The solution delineated above is simple and effective and does not require the development of a particularly complicated parser; in fact, it must only be able to recognize the square brackets "[".

In order to execute an operation of control of the indices, the information regarding the vector subjected to testing is used.

By way of example:
given the variable x thus defined
int x[10];
the instruction sizeo(x) supplies a datum that indicates the sixe in bytes of x;
the instruction sizeo(x[0]) supplies a datum that indicates the size of the individual element.
Via the operation of division:

$$\text{vector size} = \text{sizeo}(x)/\text{sizeo}(x[0])$$

the number of elements that constitute the vector x is obtained.

What has been set forth above applies only if x is a vector defined in a static way, i.e., if it is not a pointer, or if it is contained within a structure as in the example of the "list" structure that will be described hereinafter with reference to Table 4, where the vectors a, b, and c are contained. In fact, otherwise, the result would always be equal to the division of the size in bytes of a pointer, which, in the case of a 32-bit architecture, is always equal to 4 times the value returned by the instruction of sizeof(x[0]). For this reason, the instruction sizeo(x) assumes the value of size in bytes of the vector if the variable x is a vector, or else assumes the value of size in bytes of a pointer if the variable x is a pointer.

To overcome the above limit, the procedure of syntactic analysis AS envisages introducing a step of comparison between the addresses &x and &x[0] of the variable x and of its first element x[0]: if said addresses &x and &x[0] are the same it is a static vector defined in the stack or else is contained within a structure; see, for example, in Table 4 the code corresponding to "list" (contained in the stack or created dynamically); otherwise, the variable x is a pointer.

By way of example, said step of comparison of the addresses &x and &x[0] can have the following form:
if the addresses &x and &x[0] are the same, x is a vector;
if the addresses &x and &x[0] are different, x is a pointer.

At the end of the test, the function f( . . . ) receives the following parameters in the case of a structure of a type x[y]:
variable x, vector or pointer according to the cases;
the address of the variable x, &x;
the address of the first element of the variable x, &x[0];
the size of the variable x, sizeof(x);
the size of the first element of the variable x, sizeof(x[0]);
y, the parameter with which the variable x is indicized;

further parameters to trace back to the errors made and for the reports, which will be illustrated in what follows.

By way of example:
from x[y]=1;
we obtain:
x[io_sper(y, 0, io_index, (void *)x, (void *)&x, (void *)&(x[0]), sizeof(x), sizeof(x[0]), macro_arg(y), "x", " ", ORIG_FILE, _LINE_)]=1;
where io_sper( . . . ) corresponds to the test function f( . . . ), as will be shown in greater detail in what follows.

In the case of a two-dimensional vector:
from x[y][z]=3;
we obtain:
x[io_sper(y, 0, io_index, (void *)x, (void *)&x, (void *)&(x[0]), sizeof(x), sizeof(x[0]), macro_arg(y), "x", " ", ORIG_FILE, _LINE_)]
[io_sper(z, 1, io_index, (void *)x[io_index[0]], (void *)&x[io_index[0]], (void *)&(x[io_index[0]][0]), sizeof(x[io_index[0]]), sizeof(x[io_index[0]][0]), macro_arg(z), "x[% d]", "0", ORIG_FILE, _LINE_)]=3;

The test function "io_sper( . . . )", as mentioned previously, in the embodiment described herein, implements the test function f( . . . ) and envisages the following verification steps:
a) verifying that the variable x, passed as pointer, is not NULL;
b) once the verification step a) has been passed, verifying whether the variable x is a pointer or a vector;
c) if in step b) it is found that the variable x is a vector, verifying that both the index y is not negative (buffer underflow), and that the index y does not exceed the limits thereof (buffer overflow);
d) if the variable x is a pointer, verifying that the index is not negative; otherwise, a warning signal is emitted.

Figure 4:
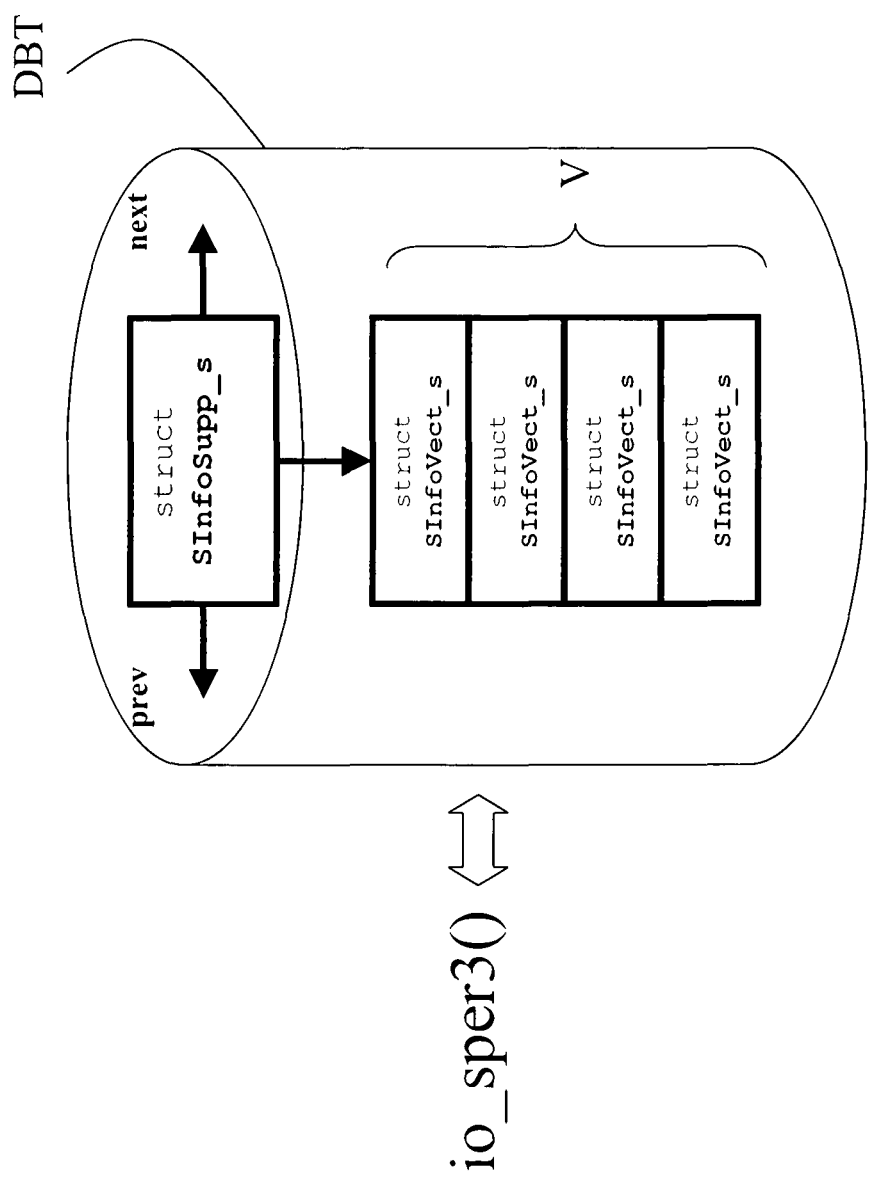
FIG. 4 shows a block diagram of a database employed in a variant of the process of verification according to the invention.

In the sequel of the present description, with reference to Tables 7-15 and to FIG. 4, a variant of step d) is described, in which operations for handling the pointer are performed.

Simplifying, the cases signalled by the test function "io_sper( . . . )" are four:
a) pointer NULL;
b) negative index in the case of vector;
c) buffer overflow in the case of vector;
d) negative index, in the case of pointer.

At the end of said verification steps, the test function "io_sper( . . . )" returns the index with which it is desired to indicize the vector, as will be illustrated more fully in what follows.

The test function f( . . . ) also enables verification of the indices of pointers, supplying the file name and/or the line number and/or the name of the variable undergoing verification.

Hence, on the basis of what has been said so far, the procedure of syntactic analysis AS, suited to C/C++ language, operates to introduce in the source program P the test function f( . . . ), in the examples of embodiment described above said test function f( . . . ) being implemented by the test function "io_sper( . . . )", as well as, in the case of embedded applications, by the test function "io_sper2( . . . )", as described in what follows.

Basically, all the operations regarding the structures and the pointers have the aim of converting as much of the code as possible into structures of a vector type, i.e., of a type "x[y]".

The procedure of syntactic analysis AS envisages one or more of the following steps of analysis and syntactic conversion executed on the source program P:
a) removal of the continents;
b) removal of the superfluous round brackets, for example, from "(( . . . ))" to "( . . . )";
c) replacement of the string ")→" with "+0)→";
d) subsequent removal of the superfluous round brackets, for example, from "(( . . . )" to "( . . . )";
e) removal of the space before and after the string "→", for example: from "x →" to "x→";
f) replacement of the string "→" with "[0].";
g) removal of the spaces in the names of the variables, for example, from "x [i]" to "x[i]";
h) conversion of the dereferentiation of a pointer into a vector, for example, from "*p" to "(p)[0]";
i) subsequent removal of the superfluous round brackets, for example, from "(( . . . )" to "( . . . )";
j) removal of useless brackets in the names of variables, for example, from "(x[0]).a" to "x[0].a";
k) insertion of the vector "io_index[ . . . ]";
l) insertion of the test functions f in the vectors, i.e., insertion of the functions "io_sper( . . . )" and "io_sper2( . . . )".

It should be noted that steps f) and h) enable an increase in the number of cases tested in the case of pointers:
"*p"→"(p)[0]"
"→"→"[0]".

In the part of description that follows the parameters of the test function io_sper( ) will be described, by way of non-limiting example, according to the embodiment disclosed herein:
int io_sper(int vett_ind,
int io_index_pos,
int *io_index,
void *vett,
void *add_vett,
void *add_vett_0,
int size_of_vett,
int size_of_vett_0,
char *vett_ind_str,
char *Format,
char *IndexStr,
char *file_name,
int file_line);
Hence, from:
x[y]=1;
we obtain:
x[io_sper(y, 0, io_index, (void *)x, (void *)&x, (void *)&(x[0]), sizeof(x), sizeof(x[0]), macro_arg(y), "x", " ", ORIG_FILE, _LINE_)]=1;

In Table 1 appearing hereinafter by way of example, the first column presents the parameters of the function, the second column presents the form assumed in the case of the example "x[y]=1;", and the third column explains the meaning of each parameter.

Examining in detail the parameters of the test function "io_sper", the vector-index parameter vett_ind is the value with which it is intended to indicize the vector and that is the object of the check.

In the case of
x[y]=1;
it is "y".

The parameter "io_index_pos" is the index to be supplied

TABLE 1

| int io_sper(int vett_ind, | int io_sper(y, | int io_sper(index of the vector, |
| int io_index_pos, | 0, | index of io_index, |
| int *io_index, | io_index, | vector of the indices, |

TABLE 1-continued

| | | |
|---|---|---|
| void *vett, | (void *)x, | indicized vector, |
| void *add_vett, | (void *)&x, | address of the vector, |
| void *add_vett_0, | (void *)&(x[0]), | address of the 1st element, |
| int size_of_vett, | sizeof(x), | size of vector, |
| int size_of_vett_0, | sizeof(x[0]), | size of 1 st element, |
| char *vett_ind_str, | macro_arg(y), | string of the index, |
| char *Format, | "x", | vector format, |
| char *IndexStr, | "", | string with the indices, |
| char *file_name, | ORIG_FILE, | file name, |
| int file_line) | _LINE_) | file line) | to the vector "io_index".

The parameter "io_index" is a vector introduced automatically by the procedure of syntactic analysis AS after the opening brace ("{"), before each variable declaration. Its size is equal to the maximum sum of the sizes of the vectors present in an instruction in the part of code before the closing brace ("}").

For example, in the case where the variable x is:

```
{
    x[3] = y[2][ii] + z[2] + 4;    // thwere are 4 indicizations
    y[1][2] = -3;                   // there are 2 indicizations
}
``` the above is transformed into:

```
{ int io_index[4];
    x[3] = y[2][ii] + z[2] + 4;
    y[1][2] = -3;
}
```

The task of the parameter "io_index" is to store the indices supplied to a vector.

In the above example (x[y]=1;) we have obtained:
x[io_sper(y, 0, io_index, (void *)x, (void *)&x, (void *)&(x[0]), sizeof(x), sizeof(x[0]), macro_arg(y), "x", " ", ORIG_FILE, _LINE_)]=1;
within the test function io_sper, stored in io_sper[0] is the index value y (or at most the one supplied by the user in the case of error management), i.e., the value that is supplied to the indicized vector (x[ . . . ]), which is the return value of io_sper:
io_index[io_index_pos]=vett_ind;
The values stored in io_index enable, during writing of reports R of the results, the identification of the exact memory location in which the error has occurred.

For example, given:

...
    int x[10][10][10];
...
    ii = 8;
...
    x[ii][4][15] = 7;    // here an error is signalled
...

The report R signals that in x[8][4] a buffer overflow has occurred. It does not supply x[ii][4], but the exact location.

The usefulness of this variable is evident when a multiple vector is indicized. From the example given above, we find that:
from
y=2;
z=7;
x[y][z]=3;
we obtain:
y=2;
z=7;
x[io_sper(y, 0, io_index, (void *)x, (void *)&x, (void *)&(x[0]), sizeof(x), sizeof(x[0]), macro_arg(y), "x", " ", ORIG_FILE, _LINE_)]
[io_sper(z, 1, io_index, (void *)x[io_index[0]], (void *)&x[io_index[0]], (void *)&(x[io_index[0]][0]), sizeof(x[io_index[0]]), sizeof(x[io_index[0]][0]), macro_arg(z), "x[% d]", "0", ORIG_FILE, _LINE_)]=3;

It may be noted that in the second call of the test function io_sper there appears "x[io_index[0]]", where io_index[0] contains the value supplied to the first index via the first call to io_sper, whereas contained in "io_index[1]" is the second index:
io_index[0]=2 (in so far as y=2)
io_index[1]=7 (in so far as z=7)
In practice, the vector io_index stores in chronological order the use of the indices of the vectors inside the instructions during execution.

It should be noted that the foregoing applies if the compiler Z gets the assignments of the indices to be made from left to right; otherwise, the values supplied on the positions are not altogether correct, but the error identified is real.

The parameter "vett" corresponds to the vector that is being tested.
In the case of
x[y]=1;
it is "x".
The parameter "add_vett" corresponds to the address of the vector being tested.
In the case of
x[y]=1;
it is "&x".
The parameter "add_vett_0" corresponds to the address of the first element of the vector being tested.
In the case of
x[y]=1;
it is "&x[0]".
The parameter "size_of_vett" corresponds to the size in bytes of the vector being tested.
In the case of
x[y]=1;
it is "sizeof(x)".
The parameter "size_of_vett_0" corresponds to the size in bytes of the first element of the vector being tested.
In the case of
x[y]=1;
it is "sizeof(x[0])".

The parameter "vett_ind_str" corresponds to the string of the argument of the vector.

In the case of x[y]=1;

it is "y".

Said string is passed via the macro "macro_arg" defined in the module "io_sper_functions.h" described in what follows:

define macro_arg(argument) #argument

Hence in this way:

macro_arg(y)

The parameter "Format" corresponds to the format with which the vector with the error is printed.

In the case of x[y]=1;

it is "x".

In the case of x[y][z]=1;

it is a vector for the report "x[% d]", which will be illustrated in greater detail in what follows.

The parameter "IndexStr" corresponds to the list of the indices of io_index (described in text format), which contain the indices of the vector with being tested.

In the case of x[y][z]=1;

it is:

an empty string " " for the test of the first index;

"0" for the test of the second index

The parameter "file_name" corresponds to the name of the source file, i.e., of the original source program P, not the one of the file obtained from syntactic analysis, in which the error has occurred. Said parameter "file_name" is supplied via the definition instruction define ORIG_FILE, which is inserted at the head of each modified source file, in the case of the file "nomefile.c" we have:

define ORIG_FILE "nomefile.c"

The parameter "file_line" corresponds to the line of the source file, i.e., of the source program P, in which the error has occurred and is supplied via _LINE_. The value that would insert the procedure of syntactic analysis AS is that of the new modified program P', but account must be taken of the fact that inserted therein at the head of the procedure of syntactic analysis AS are two commands:

include "io_sper_functions.h"

define ORIG_FILE "nomefile.c"

on account of which the line number would be two units higher than the numbering of the source computer program P. For this reason, also inserted in the procedure of syntactic analysis AS is the command #line 1.

In conclusion, at the head of the modified source program P' the following instructions are inserted:

include "io_sper_functions.h"

define ORIG_FILE "nomefile.c"

line 1

As mentioned above, there is envisaged a vector for the report in the element "x[% d]". It makes it possible to write in the report which is the badly indicized memory address (the variable).

With this element and the immediately subsequent one ("0") it is possible to reconstruct the string of the memory address:

"x[% d]" supplies the format, whereas "0" contains in ASCII format the number of the index of io_index to which the vector makes reference: in practice, inside it there is created the string to be used for the output with, for example, the instruction sprintf(Out, "x[% d]", io_index[atoi("0")]). If we were to have "x[% d] [% d]" and "0 1" we would have sprintf(Out, "x[% d][% d]", io_index[atoi("0")], io_index[atoi("1")]). As has been said above, it is only an example of possible code. This operation is executed by the function write_str( . . . ).

Given the impossibility of performing any writing on files in the cases of embedded applications, to return at output the information on the errors without requiring an overhead hardware, instead of supplying at output the strings with the names of the files and with the strings of the files and with the names of the variables involved, the process envisages a function "io_sper2( . . . )", which is a variant of the function "io_sper( . . . )" with the following modifications:

the name of the file is no longer identified with a string, but with an identifier (a number);

the name of the vector under examination is supplied with an identifier.

Said function passes, to the function ErrorFunction2( . . . ), which implements the module of interface IF in the embedded case, a small data structure with the information for tracing back to the error that has occurred.

In order to render use of the software as flexible as possible, the process according to the invention comprises an interfacing module or function for the programmer IF: the test function "io_sper" identifies the four errors mentioned above and signals them to an interfacing function IF, visible to the programmer, which, in the embodiment illustrated here, is the function ErrorFunction, enabling the programmer to decide at his own discretion what actions to undertake on a case-by-case basis, for example, display on the screen the errors identified, write on a file a corresponding report, send them via CAN in the case of control units on motor vehicles, via SMS, or the like. In addition, the programmer can decide whether to interrupt the program with a function "exit( )". If, for example, the index is negative, he can decide to make the function "io_sper" to return the value 0 so as to prevent underflow. In the case of a pointer, he can check that a certain value is not being exceeded.

Hence, according to the process, whenever the function io_sper identifies an error, it calls the interfacing function ErrorFunction that is under the complete control of the programmer, who can to decide the appropriate actions take. Whereas the first three errors referred to above, i.e., null-pointer error, negative index on vector, and buffer overflow on vector, the other is only hypothetical, and it is up to the programmer to decide how to interpret it.

For example:

//int x[10];

//int *p, *q;

//

//p=x;

//p[-1]=1; //here there it is an error

//

//q=&x[1];

//q[-1]=1; //this is not an error (line 85)

This example can be used to show the flexibility of the approach. "q[-1]" is not an error, but this is known only to the programmer. In the interface function ErrorFunctions he can indicate that the case of negative index in line 85 in actual fact is not an error and hence get writing of the error in the report R to be skipped.

In Table 2, provided hereinafter is the code of the header of the function of interface Errorfunctions in the embodiment illustrated here.

TABLE 2 ifndef ErrorFunctionsH
 #define ErrorFunctionsH
include <stdio.h>

TABLE 2-continued

```
#include <stdlib.h>
#include <string.h>
#include <ctype.h>
enum {NO_ERROR, NULL_POINTER, BUFFER_UNDERFLOW,
BUFFER_OVERFLOW, NEG_POINTER_INDEX,
POS_POINTER_INDEX};
typedef struct ErrorInfo_s {
unsigned short int usFileId;      // File Id
unsigned short int usLINE;        // Line
unsigned short int usVarId;       // Variable Id
char cErrorId;                    // Error Id
char cVarPosId;                   // position of index in
                                  instruction
int ivett_ind;                    // index supplied
} SerrorInfo;
    int ErrorFunction(char *pcFormatOut, char *pcfile_name, int
ifile_line, char *pcvett_ind_str, int ivett_ind, int iMaxDim,
int iErrorType);
    int ErrorFunction2(SErrorInfo ErrorInfo);
#endif
```

The enumerative type in Table 2 indicates the errors:

```
enum {NO_ERROR,              //no error
    NULL_POINTER,            //null pointer
    BUFFER_UNDERFLOW,        //buffer underflow
    BUFFER_OVERFLOW,         //buffer overflow
    NEG_POINTER_INDEX,       //negative index in a pointer
    POS_POINTER_INDEX};      //index zero or positive in a
                             pointer
```

Inside the interfacing function of Table 2 the structure struct "ErrorInfo_s" is defined.

Said structure struct is used for the test for embedded programs. On account of the impossibility of there being little space available in the memory for the executable and on account of the impossibility of storing large amounts of data, there has been introduced the possibility of handling only the information that is essential for the report:

usFileId is the Id of the source file; the association is performed off line looking for the name of the file on a file generated during parsing (e.g., "ListFileVariables.txt");

usLINE is the number of lines in the file;

usVarId is the Id of the variable with the error; the association is performed off line with the file generated during parsing;

cErrorId indicates the Id of the error as defined in "ErrorFunctions.h":

enum {NO_ERROR, NULL_POINTER, BUFFER_UNDERFLOW, BUFFER_OVERFLOW, NEG_POINTER_INDEX, POS_POINTER_INDEX};

cVarPosId indicates the position of the index of a vector inside an instruction (counting starts from 0);

ivett_ind is the index entered in the vector.

Said structure is passed as parameter to the interfacing function "ErrorFunction2", which can be managed by the programmer (for example, it can send on a CAN the datum or store it on a local memory).

Of course, the function of Table 2 is only an example of data structure that can be used to provide a report; there is nothing, for example, that rules out creation of a function similar to the test function io_sper2( . . . ) that uses other data structures.

Indicated, instead, in Table 3, once again by way by way of example of the embodiment illustrated herein, is the code of the interfacing function ErrorFunctions.c.

TABLE 3

```
#include "ErrorFunctions.h"
//activation of test on the maximum index
#define TEST_MAX_INDEX 1
int ErrorFunction(char *pcFormatut, char *pcfile_name, int
ifile_line, char *pcvett_ind_str, int ivett_ind, int
iMaxDim, int iErrorType)
{
    static int icntError = 0;
    icntError++;
    // an attempt is being made to write in a null pointer
    // E.g.:
    // int *p;
    // p = NULL;
    // *p = 1;
    if(iErrorType == NULL_POINTER)
    {
        printf("\npointer %s NULL! \n", pcFormatut);
        printf("file: %s line:\t%d\n", pcfile_name,
ifile_line);
        exit(1);
    }
    // an attempt is being made to write using a negative
index on static vector
    // E.g.:
    // int x[10];
    // x[-1] = 0;
    if(iErrorType == BUFFER_UNDERFLOW)
    {
        printf("\nnegative index: \"%s\"\n", pcFormatut);
        printf("index name:\t%s\n", pcvett_ind_str);
        printf("supplied value:\t%d\n", ivett_ind);
        printf("file: %s line:\t%d\n", pcfile_name,
ifile_line);
        exit(1);
    }
    // Buffer Overflow
    // E.g.:
    // int x[10];
    // x[12] = 0;
    if(iErrorType == BUFFER_OVERFLOW)
    {
        printf("\nmaximum size allowed for \"%s\": %d\n",
pcFormatut, iMaxDim);
        printf("index name:\t%s\n", pcvett_ind_str);
        printf("supplied value:\t%d\n", ivett_ind);
        printf("file: %s line:\t%d\n", pcfile_name,
ifile_line);
        exit(1);
    }
    // Negative index
    // E.g.:
    // int x[10];
    // int *p, *q;
    //
    // p = x;
    // p[-1] = 1;   //here it is an error
    //
    // q = &x[1];
    // q[-1] = 1;   //here it is not an error (for this reason
there is no exit)
    if(iErrorType == NEG_POINTER_INDEX)
    {
        printf("\nWARNING! It could be out of the allowed range
\n");
        printf("variable name: \"%s\"\n", pcFormatut);
        printf("index name:\t%s\n", pcvett_ind_str);
        printf("supplied value:\t%d\n", ivett_ind);
        printf("file: %s line:\t%d\n", pcfile_name,
ifile_line);
    }
#if TEST_MAX_INDEX == 1
    // Positive index in a pointer
    // E.g.:
    // int x[10];
    // int *p, *q;
    //
    // p = x;
    // p[10] = 1; //here it is an error
    //
    // q = &x[1];
```

TABLE 3-continued

```
    // q[9] = 1; //here it is an error
    if(iErrorType == POS_POINTER_INDEX)
    {
        //THIS PART OF THE CODE MUST BE FULLY MANAGED
BY THE PROGRAMMER
        //OTHERWISE IT IS TO BE IGNORED
        if(ivett_ind > 9)
        {
            printf("\nWARNING! The index of the pointer exceeds
the allowed value!\n");
            printf("variable name: \"%s\"\n", pcFormatut);
            printf("index name:\t%s\n", pcvett_ind_str);
            printf("supplied value:\t%d\n", ivett_ind);
            printf("file: %s line:\t%d\n", pcfile_name,
ifile_line);
        }
        if(strcmp(pcFormatut, "q") == 0 && ivett_ind > 8)
        {
            printf("\nWARNING! The index of the pointer exceeds
the allowed value!\n");
            printf("variable name: \"%s\"\n", pcFormatut);
            printf("\nmaximum size allowed: 8\n");
            printf("index name:\t%s\n", pcvett_ind_str);
            printf("supplied value:\t%d\n", ivett_ind);
            printf("file: %s line:\t%d\n", pcfile_name,
ifile_line);
        }
        if(strcmp(pcfile_name, "C:\\prova\\prova.c") == 0
            && ifile_line == 105
            && strcmp(pcFormatut, "q") == 0
            && ivett_ind > 5)
        {
            printf("\nWARNING! The index of the pointer exceeds
the allowed value!\n");
            printf("variable name: \"%s\"\n", pcFormatut);
            printf("\nmaximum size allowed : 5\n");
            printf("index name:\t%s\n", pcvett_ind_str);
            printf("supplied value:\t%d\n", ivett_ind);
            printf("file: %s line:\t%d\n", pcfile_name,
ifile_line);
        }
    }
    //end of test on maximum index
#endif
    return ivett_ind;
}
int ErrorFunction2(SErrorInfo ErrorInfo)
{
    // an attempt is being made to write in a null pointer
    // E.g.:
    // int *p;
    // p = NULL;
    // *p = 1;
    if(ErrorInfo.cErrorId == NULL_POINTER)
    {
        printf("\nPointer NULL! \n\n");
        printf("Error Id:\t%d\n", (int)ErrorInfo.cErrorId);
        printf("File Id:\t%d\n", (int)ErrorInfo.usFileId);
        printf("Line number:\t%d\n", (int)ErrorInfo.usLINE);
        printf("Variable Id:\t%d\n", (int)ErrorInfo.usVarId);
        printf("Index position:\t%d\n",
(int)ErrorInfo.cVarPosId);
        printf("Supplied index:\t%d\n\n", ErrorInfo.ivett_ind);
        exit(1);
    }
    // an attempt is being made to write using a negative
index on static vector
    // E.g.:
    // int x[10];
    // x[-1] = 0;
    if(ErrorInfo.cErrorId == BUFFER_UNDERFLOW)
    {
        printf("\nNegative index on static vector!\n\n");
        printf("Error Id:\t%d\n", (int)ErrorInfo.cErrorId);
        printf("File Id:\t%d\n", (int)ErrorInfo.usFileId);
        printf("Line number:\t%d\n", (int)ErrorInfo.usLINE);
        printf("Variable Id:\t%d\n", (int)ErrorInfo.usVarId);
        printf("Index position:\t%d\n",
(int)ErrorInfo.cVarPosId);
        printf("Supplied index:\t%d\n\n", ErrorInfo.ivett_ind);
        exit(1);
    }
    // Buffer Overflow
    // E.g.:
    // int x[10];
    // x[12] = 0;
    if(ErrorInfo.cErrorId == BUFFER_OVERFLOW)
    {
        printf("\nBuffer Overflow!\n\n");
        printf("Error Id:\t%d\n", (int)ErrorInfo.cErrorId);
        printf("File Id:\t%d\n", (int)ErrorInfo.usFileId);
        printf("Line number:\t%d\n", (int)ErrorInfo.usLINE);
        printf("Variable Id:\t%d\n", (int)ErrorInfo.usVarId);
        printf("Index position:\t%d\n",
(int)ErrorInfo.cVarPosId);
        printf("Supplied index:\t%d\n\n", ErrorInfo.ivett_ind);
        exit(1);
    }
    // Negative index
    // E.g.:
    // int x[10];
    // int *p, *q;
    //
    // p = x;
    // p[-1] = 1;   //here it is an error
    //
    // q = &x[1];
    // q[-1] = 1;   //here it is not an error (for this reason
there is no exit)
    if(ErrorInfo.cErrorId == NEG_POINTER_INDEX)
    {
        printf("\nNegative index!\n");
        printf("Error Id:\t%d\n", (int)ErrorInfo.cErrorId);
        printf("File Id:\t%d\n", (int)ErrorInfo.usFileId);
        printf("Line number:\t%d\n", (int)ErrorInfo.usLINE);
        printf("Variable Id:\t%d\n", (int)ErrorInfo.usVarId);
        printf("Index position:\t%d\n",
(int)ErrorInfo.cVarPosId);
        printf("Supplied index:\t%d\n\n", ErrorInfo.ivett_ind);
    }
#if TEST_MAX_INDEX == 1
    // Positive index in a pointer
    // E.g.:
    // int x[10];
    // int *p, *q;
    //
    // p = x;
    // p[10] = 1;   //here it is an error
    //
    // q = &x[1];
    // q[9] = 1;   //here it is an error
    if(ErrorInfo.cErrorId == POS_POINTER_INDEX)
    {
        //THIS PART OF THE CODE MUST BE FULLY MANAGED
BY THE PROGRAMMER
        //OTHERWISE IT IS TO BE IGNORED
        if(ErrorInfo.ivett_ind > 9)
        {
            printf("\nWARNING! The index of the pointer exceeds
the allowed value!\n");
            printf("\nmaximum size allowed : 9\n");
            printf("Error Id:\t%d\n", (int)ErrorInfo.cErrorId);
            printf("File Id:\t%d\n", (int)ErrorInfo.usFileId);
            printf("Line number:\t%d\n", (int)ErrorInfo.usLINE);
            printf("Variable Id:\t%d\n", (int)ErrorInfo.usVarId);
            printf("Index position:\t%d\n",
(int)ErrorInfo.cVarPosId);
            printf("Supplied index:\t%d\n\n",
ErrorInfo.ivett_ind);
        }
        if((int)ErrorInfo.usVarId == 3 && ErrorInfo.ivett_ind >
9)
        {
            printf("\nWARNING! The index of the pointer exceeds
the allowed value!\n");
            printf("\nmaximum size allowed : 9\n");
            printf("Error Id:\t%d\n", (int)ErrorInfo.cErrorId);
            printf("File Id:\t%d\n", (int)ErrorInfo.usFileId);
```

TABLE 3-continued

```
        printf("Line number:\t%d\n", (int)ErrorInfo.usLINE);
        printf("Variable Id:\t%d\n", (int)ErrorInfo.usVarId);
        printf("Index position:\t%d\n",
(int)ErrorInfo.cVarPosId);
        printf("Supplied index:\t%d\n\n",
ErrorInfo.ivett_ind);
      }
    }
#endif
    return ErrorInfo.ivett_ind;
}
```

In the ensuing Tables 4, 5 and 6, an example of operation of the process proposed is illustrated.

Table 4 illustrates by way of example a source program P, referred to as list( ), to be subjected to the process of verification according to the invention.

TABLE 4

```
typedef struct list {
  char a[10];
  char b[10];
  char c[10];
};
int main( )
{
  int x[10];
  int mtx[10][10];
  int y, z;
  struct list EL;
  y = 12;
  x[y] = 1;
  y = 2;
  z = 15;
  mtx[y][z] = 2;
  y = 15;
  z = 2;
  mtx[y][z] = 2;
  mtx[z][11] = 2;
  EL.a[-1] = 'a';
  EL.a[10] = 'a';
  EL.b[-1] = 'b';
  EL.b[11] = 'b';
  EL.c[-1] = 'c';
  EL.c[12] = 'c';
  return 0;
}
```

Table 5 illustrated a program P' modified following upon the operations performed on the source program P by the procedure of syntactic analysis AS.

TABLE 5

```
#include "io_sper_functions.h"
#define ORIG_FILE "C:\\prova\\prova.c"
#line 1
typedef struct list {
char a[10];
char b[10];
char c[10];
};
int main( )
{ int io_index[2];
int x[10];
int mtx[10][10];
int y, z;
struct list EL;
y = 12;
x[io_sper(y, 0, io_index, (void *)x, (void *)&x, (void
*)&(x[0]), sizeof(x), sizeof(x[0]), macro_arg(y), "x", "",
ORIG_FILE, __LINE__)] = 1;
y = 2;
z = 15;
```

TABLE 5-continued

```
mtx[io_sper(y, 0, io_index, (void *)mtx, (void *)&mtx, (void
*)&(mtx[0]), sizeof(mtx), sizeof(mtx[0]), macro_arg(y),
"mtx", "", ORIG_FILE, __LINE__)][io_sper(z, 1, io_index,
(void *)mtx[io_index[0]], (void *)&mtx[io_index[0]], (void
*)&(mtx[io_index[0]][0]), sizeof(mtx[io_index[0]]),
sizeof(mtx[io_index[0]][0]), macro_arg(z), "mtx[%d]", " 0",
ORIG_FILE, __LINE__)] = 2;
y = 15;
z = 2;
mtx[io_sper(y, 0, io_index, (void *)mtx, (void *)&mtx, (void
*)&(mtx[0]), sizeof(mtx), sizeof(mtx[0]), macro_arg(y),
"mtx", "", ORIG_FILE, __LINE__)][io_sper(z, 1, io_index,
(void *)mtx[io_index[0]], (void *)&mtx[io_index[0]], (void
*)&(mtx[io_index[0]][0]), sizeof(mtx[io_index[0]]),
sizeof(mtx[io_index[0]][0]), macro_arg(z), "mtx[%d]", " 0",
ORIG_FILE, __LINE__)] = 2;
mtx[io_sper(z, 0, io_index, (void *)mtx, (void *)&mtx, (void
*)&(mtx[0]), sizeof(mtx), sizeof(mtx[0]), macro_arg(z),
"mtx", "", ORIG_FILE, __LINE__)][io_sper(11, 1, io_index,
(void *)mtx[io_index[0]], (void *)&mtx[io_index[0]], (void
*)&(mtx[io_index[0]][0]), sizeof(mtx[io_index[0]]),
sizeof(mtx[io_index[0]][0]), macro_arg(11), "mtx[%d]", " 0",
ORIG_FILE, __LINE__)] = 2;
EL.a[io_sper(-1, 0, io_index, (void *)EL.a, (void *)&EL.a,
(void *)&(EL.a[0]), sizeof(EL.a), sizeof(EL.a[0]),
macro_arg(-1), "EL.a", "", ORIG_FILE, __LINE__)] = 'a';
EL.a[io_sper(10, 0, io_index, (void *)EL.a, (void *)&EL.a,
(void *)&(EL.a[0]), sizeof(EL.a), sizeof(EL.a[0]),
macro_arg(10), "EL.a", "", ORIG_FILE, __LINE__)] = 'a';
EL.b[io_sper(-1, 0, io_index, (void *)EL.b, (void *)&EL.b,
(void *)&(EL.b[0]), sizeof(EL.b), sizeof(EL.b[0]),
macro_arg(-1), "EL.b", "", ORIG_FILE, __LINE__)] = 'b';
EL.b[io_sper(11, 0, io_index, (void *)EL.b, (void *)&EL.b,
(void *)&(EL.b[0]), sizeof(EL.b), sizeof(EL.b[0]),
macro_arg(11), "EL.b", "", ORIG_FILE, __LINE__)] = 'b';
EL.c[io_sper(-1, 0, io_index, (void *)EL.c, (void *)&EL.c,
(void *)&(EL.c[0]), sizeof(EL.c), sizeof(EL.c[0]),
macro_arg(-1), "EL.c", "", ORIG_FILE, __LINE__)] = 'c';
EL.c[io_sper(12, 0, io_index, (void *)EL.c, (void *)&EL.c,
(void *)&(EL.c[0]), sizeof(EL.c), sizeof(EL.c[0]),
macro_arg(12), "EL.c", "", ORIG_FILE, __LINE__)] = 'c';
return 0;
}
```

Table 6 represents a report R of errors obtained by the process of verification proposed.

TABLE 6

```
maximum size allowed for "x": 9
index name: y
supplied value:    12
file: C:\prova\prova.c line:      15
maximum size allowed for "mtx[2]": 9
index name: z
supplied value:    15
file: C:\prova\prova.c line:      19
maximum size allowed for "mtx": 9
index name: y
supplied value:    15
file: C:\prova\prova.c line:      23
maximum size allowed for "mtx[2]": 9
index name: 11
supplied value:    11
file: C:\prova\prova.c line:      25
negative index: "EL.a"
index name: -1
supplied value:    -1
file: C:\prova\prova.c line:      27
maximum size allowed for "EL.a": 9
index name: 10
supplied value:    10
file: C:\prova\prova.c line:      28
negative index: "EL.b"
index name: -1
supplied value:    -1
file: C:\prova\prova.c line:      30
maximum size allowed for "EL.b": 9
```

TABLE 6-continued

```
index name: 11
supplied value:    11
file: C:\prova\prova.c line:    31
negative index: "EL.c"
index name: −1
supplied value:    −1
file: C:\prova\prova.c line:    33
maximum size allowed for "EL.c": 9
index name: 12
supplied value:    12
file: C:\prova\prova.c line:    34
```

Described in what follows is a further embodiment of the process of verification according to the invention, which is able to handle also the pointers. The test function "io_sper( . . . )" or io_sper2( . . . ), as described previously, implements the test function f( . . . ) and envisages the step d) in which, if the variable x is a pointer, it verifies that the index is not negative; otherwise, a warning signal is emitted. It is thus possible to recognize the presence of pointers, but it is not clear whether a pointer points to an memory area actually allocated (in the memory stack or in the so-called heap memory) or whether it exits from the vectors or data structures to which it is pointing.

According to the further embodiment of the process of verification proposed, it is envisaged to create a database internal to the test function ( . . . ), such as the function "io_sper" or its variants previously illustrated, which is able to verify, during the operation of execution, whether an index y supplied for a variable x is valid. Said database, designated by DBT in FIG. 4, contains the addresses of start and end of the variables allocated during the operation of the program, with particular attention paid to the problem of preventing dynamic allocation of the memory in the case of embedded applications.

According to the solution proposed, said database DBT is dynamically variable in size during operation, but using not a dynamic allocation of the elements of the data structure, as occurs, for example, using the functions "malloc" and "calloc" for the C language or the function "new" for the C++ language, but using a static allocation. For this purpose there is envisaged introduction, for each variable declared in the stack, of a variable containing the information inherent in the latter. Said introduction is implemented by means of the process of syntactic analysis AS that introduces the variable in the source code.

Said process of syntactic analysis AS needs to understand where the declarations of the variables terminate. Said problem arises for the C language, not for C++ in so far as in the latter language the declaration of a variable is allowed in any point of the code. Hence, for this purpose the proposed solution envisages recourse to the use of braces "{ . . . }", which enable execution of the operation in a simple way.

The following example enables an understanding of the solution proposed.

Given the following code:

```
f (void)
{
int x;
int vect[10] ;
char c ;
...
}
``` in it there are three variables, x, vect and c, of which it is desired to store the addresses of the memory space occupied thereby, namely:

for the variable x, the addresses &x and &x+sizeof(x);
for the variable vect, the addresses &vect and &vect+sizeof(vect);
for the variable c, the addresses &c and &c+sizeof(c).

For storage of this information there is introduced in the database DBT the data structure struct SInfoVect_s, illustrated in FIG. 4 and defined as illustrated in Table 7 below.

TABLE 7

```
typedef struct SinfoVect_s {
int file_line;
char *pcVarStr;
void *startAdd;
void *stopAdd;
int valid;
} SinfoVect;
``` where:
file_line indicates the line number in which the variable has been declared;
pcVarStr indicates the string that identifies the variable, for example, for "int x;" it is "x";
startAdd indicates the starting address of the variable;
stopAdd indicates the starting address of the variable;
valid indicates whether the variable is still used.

According to the embodiment described herein, it is envisaged to allocate at each open brace "{" a vector V, illustrated in FIG. 4, of said data structures "struct SInfoVect_s" containing as many elements as are the variables allocated inside the area being managed thereby (i.e., up to closing of the braces, marked by the closed brace "}"). Said vector is inserted in a higher structure SInfoSupp_s, likewise illustrated in FIG. 4, which points to its starting address and is exemplified in Table 8 below.

TABLE 8

```
typedef struct SinfoSupp_s {
char *file_name;
SInfoVect *pINFO;
struct SInfoSupp_s *next;
struct SInfoSupp_s *prev;
int iNumInfoVect;
int iIsHeap;
int valid;
} SinfoSupp
```

In said higher structure SInfoSupp_s there may be noted the presence of the structure pointer "SInfoVect *pINFO;" that points to said vector.

In the higher structure SInfoSupp_s the following elements are present:
file_name, which indicates the name of the file in which the variable is declared;
pINFO, which indicates the structure pointer of the vector of the addresses;
next, which indicates the pointer to the subsequent element of the database DBT;
prev, which indicates the pointer to the previous element of the database DBT;
iNumInfoVect, which indicates number of elements valid in the memory vector;
iIsHeap, which indicates if it is a memory of the stack (0) or a memory of the heap (1);

valid, which indicates whether the element of the data structure is still valid.

In the case of the previous example regarding the variables x, vect, and c, utilizing the process of syntactic analysis according to the alternative embodiment that takes into account the pointers, a reformulation of the variables is obtained like the one expressed in Table 9, where with io_sper3( . . . ) a modified test function f( . . . ) is indicated, configured for the embodiment able to handle the pointers described here.

TABLE 9 f(void)
{ SInfoSupp InfoSupp; SInfoVect INFO[3]; memset((char*)&INFO, 0, sizeof(INFO)); InfoSupp.file_name = ORIG_FILE; InfoSupp.iNumInfoVect = 3 ; InfoSupp.pINFO = INFO; io_sper3(..., 1, &InfoSupp);{
int x; INFO[0].file_line = __LINE__; INFO[0].startAdd= &x; INFO[0].stopAdd = (void *)((int)&x + sizeof(x)); INFO[0].valid = 1; {
int vect[10] ; INFO[1].file_line = __LINE__; INFO[1].startAdd= &vect; INFO[1].stopAdd = (void *)((int)&vect + sizeof(vect)); INFO[1].valid = 1; {
char c ; INFO[2].file_line = __LINE__; INFO[1].startAdd= &vect; INFO[1].stopAdd = (void *)((int)&vect + sizeof(vect)); INFO[2].valid = 1; {
....
} INFO[2].valid = 0; } INFO[1].valid = 0; } INFO[0].valid = 0; } io_sper3(...,2, &InfoSupp); }

As may be seen from the proposed solution, the procedure of syntactic analysis only requires introduction of the variables after an open brace "{" in the source code, i.e., the variables of structure type "InfoSupp" and list type "INFO[ . . . ]", which operate respectively as basic element of the data structure and as list of the addresses.

With the operation of application of the test function "io_sper3( . . . , 1, &InfoSupp);" the element is inserted in the database DBT, and with the operation "io_sper3( . . . , 2, &InfoSupp);" it is removed; with the instruction "InfoSupp.file_name=ORIG_FILE;" the name of the file in which the variable has been allocated is stored.

After each declaration the line number INFO[0].file_line=__LINE__; and the addresses of the variables are inserted with the assignments "INFO[0].startAdd=&x; INFO[0].stopAdd=(void *) ((int) &x+sizeof(x)); . . . ".

The instruction "INFO[0].valid=1;" informs the database DBT that the address is valid, whereas the instruction "INFO [0].valid=0;" informs it that the variable is no longer used.

As may be noted, everything is solved during compilation. It is in any case possible to execute a dynamic allocation of the memory; for example, it is sufficient to replace the declarations of the variables with the insertion of said addresses directly in the test function "io_sper3". It is only one of the possible variants.

Here it is intended to recall the attention to the fact that the embodiment that envisages use of the database DBT does not require a dynamic allocation of the memory, a characteristic that is particularly advantageous in an embedded system.

Also possible for handling the pointers is, on the other hand, a solution that envisages the dynamic allocation of the memory, for example, of the variables of the structure type InfoSupp and list type INFO, like the one exemplified in Table 10 below.

TABLE 10 f(void)
{ SinfoSupp *InfoSupp; SInfoVect *INFO; InfoSupp = (SInfoSupp *)malloc(sizeof(SInfoSupp)); INFO = (SinfoVect TABLE 10-continued

*)malloc(3*sizeof(SInfoVect)); memset((char*)INFO, 0, 3*sizeof(SinfoVect)); InfoSupp.file_name = ORIG_FILE; InfoSupp->iNumInfoVect = 3 ; InfoSupp->pINFO = INFO; io_sper3(..., 1, InfoSupp);{
int x; INFO[0].file_line = __LINE__; INFO[0].startAdd= &x; INFO[0].stopAdd = (void *)((int)&x + sizeof(x)); INFO[0].valid = 1; {
int vect[10] ; INFO[1].file_line = __LINE__; INFO[1].startAdd= &vect; INFO[1].stopAdd = (void *)((int)&vect + sizeof(vect)); INFO[1].valid = 1; {
char c ; INFO[2].file_line = __LINE__; INFO[1].startAdd= &vect; INFO[1].stopAdd = (void *)((int)&vect + sizeof(vect)); INFO[2].valid = 1; {
....
} INFO[2].valid = 0; } INFO[1].valid = 0;} INFO[0].valid = 0;} io_sper(...,2, InfoSupp); }

Also possible is a variant of solution of a mixed type for allocation of the memory, where the variable InfoSupp has a static allocation, and the variable INFO has a dynamic allocation. An example of said allocation is supplied in Table 11 below.

TABLE 11 f(void)
{ SinfoSupp InfoSupp; SInfoVect *INFO; INFO = (SInfoVect *)malloc(3*sizeof(SInfoVect)); memset((char*)INFO, 0, 3*sizeof(SInfoVect)); InfoSupp.file_name = ORIG_FILE; InfoSupp.iNumInfoVect = 3 ; InfoSupp.pINFO = INFO; io_sper3(..., 1, &InfoSupp);{
int x; INFO[0].file_line = __LINE__; INFO[0].startAdd= &x; INFO[0].stopAdd = (void *)((int)&x + sizeof(x)); INFO[0].valid = 1; {
int vect[10] ; INFO[1].file_line = __LINE__; INFO[1].startAdd= &vect; INFO[1].stopAdd = (void *)((int)&vect + sizeof(vect)); INFO[1].valid = 1; {
char c ; INFO[2].file_line = __LINE__; INFO[1].startAdd= &vect; INFO[1].stopAdd = (void *)((int)&vect + sizeof(vect)); INFO[2].valid = 1; {
....
} INFO[2].valid = 0; } INFO[1].valid = 0;} INFO[0].valid = 0;} io_sper(...,2, &InfoSupp); }

Vice versa, the structure variable InfoSupp can have dynamic allocation, whereas the list variable INFO can have static allocation, as illustrated in Table 12 below.

TABLE 12 f(void)
{ SInfoSupp *InfoSupp; SInfoVect INFO[3]; InfoSupp = (SInfoSupp *)malloc(sizeof(SInfoSupp)); memset((char*)&INFO, 0, 3*sizeof(SInfoVect)); InfoSupp.file_name = ORIG_FILE; InfoSupp.iNumInfoVect = 3 ; InfoSupp.pINFO = INFO; io_sper3(..., 1, &InfoSupp);{
int x; INFO[0].file_line = __LINE__; INFO[0].startAdd= &x; INFO[0].stopAdd = (void *)((int)&x + sizeof(x)); INFO[0].valid = 1; {
int vect[10] ; INFO[1].file_line = __LINE__; INFO[1].startAdd= &vect; INFO[1].stopAdd = (void *)((int)&vect + sizeof(vect)); INFO[1].valid = 1; {
char c ; INFO[2].file_line = __LINE__; INFO[1].startAdd= &vect; INFO[1].stopAdd = (void *)((int)&vect + sizeof(vect)); INFO[2].valid = 1; {
....
} INFO[2].valid = 0; } INFO[1].valid = 0;} INFO[0].valid = 0;} io_sper(...,2, &InfoSupp); }

Finally, in the case of a fragment of code that performs a dynamic allocation of the memory with instructions of C language, such as malloc, calloc and realloc and, in the case of the C++ language, with new, recourse may be had to the dynamic allocation of the storage variables defined above (InfoSupp and INFO), this in so far as said operations can be inserted in cycles, as illustrated, for example, in Table 13 below.

TABLE 13

```
f(void)
}
int ii, x = 10;
int p;
for(ii=0; ii<x; ii++)
{
    p = (int *)malloc(20*sizeof(int));
    insertDB(p);
    x = randomF( );
}
}
```

The number of times that the malloc function is executed is not known beforehand.

The proposed solution consists in creating macros that will replace the malloc, calloc and realloc functions and that will allocate dynamically inside it the variables InfoSupp and INFO and that will recall the function io_sper3.

Likewise, a function free is defined; this is to be inserted in a function that will eliminate from the database (using the function io_sper3) the information regarding the de-allocated memory, for example, as illustrated in Table 14 below.

TABLE 14

```
#define malloc(A)    io_sper_malloc_STD(  (A),   ORIG_FILE,
    _LINE_)
#define calloc(A, B) io_sper_calloc_STD(  (A)  ,  (B),
ORIG_FILE, _LINE_)
#define realloc(A, B) io_sper_realloc_STD((void*)(A), (B),
ORIG_FILE, _LINE_)
#define free(A)   io_sper_free_STD(  (void*) (A),  ORIG_FILE,
    _LINE_)
```

Likewise, for the embedded version there will be used the data structures as illustrated in Table 15:

TABLE 15

```
Typedef struct SInfoVectId_s {
int file_line;
char *pcVarStr;
void *startAdd;
void *stopAdd;
int valid;
} SinfoVectId;
typedef struct SInfoSuppId_s {
unsigned short int file_name;
SInfoVectId *pINFO;
struct SinfoSupp_s *next;
struct SinfoSupp_s *prev;
int iNumInfoVect;
int iIsHeap;
int valid;
} SinfoSuppId;
``` and the macros

TABLE 16

```
#define malloc(A)  io_sper_malloc_EMB(  (A),  ORIG_FILE_ID,
    _LINE_)
#define calloc(A, B) io_sper_calloc_EMB(  (A)  ,  (B),
ORIG_FILE_ID, _LINE_)
#define realloc(A, B) io_sper_realloc_EMB((void*)(A), (B),
ORIG_FILE_ID, _LINE_)
#define free(A) io_sper_free_EMB(  (void*)(A),  ORIG_FILE_ID,
    _LINE_)
```

In addition, there is defined a function io_sper4, similar to the function io_sper2 but configured for executing the test on the memory, the prototype of which is given by:

TABLE 17

```
int io_sper4(int vett_ind, int i, void *vett, void
*add_vett, void *add_vett_0, int size_of_vett, int
size_of_vett_0, char *vett_ind_str, unsigned short int
Format, char *IndexStr, unsigned short int file_name, int
file_line, int iOp, SInfoSuppId *SInfoSuppElemId);
```

Hence, the advantages of the proposed solution appear clearly from what has been illustrated above.

The process of verification proposed enables the new source code to keep the same semantics as the original code, but performs a self-test during run-time. In this way, the final result is a stand-alone executable that no longer requires a starting development environment or a file ".dll" from which to recall possible test functions. In this way, it is possible to execute the executable on different machines simultaneously and with different test data.

The process of verification proposed enables:
control of buffer overflow also in the case of (one-dimensional and multidimensional) vectors defined in the stack and in the case of vectors contained in structures;
creation of one stand-alone executable containing the test functions;
independence with respect to the compiler and the operating system used;
in practical use, in addition to speeding-up of the testing/debugging step, real-time feedback on the errors that have appeared.

The process proposed also enables modification of just some parts of code. In this way, it is possible to create different versions of the same computer program, but ones that subject to testing different parts of code, without noticeably reducing the speed. In addition, on large production volumes (for example, computer programs implemented on millions of automobiles produced per year) the coverage of errors would remain practically intact.

Consequently, albeit without prejudice to the principle of the invention, the details of implementation and the embodiments may vary, even significantly, with respect to what has been described and illustrated herein purely by way of non-limiting example, without thereby departing from the framework of the invention, as defined by the ensuing claims.

The process according to the invention lends itself to different possible uses.

For instance, it can be employed in the case of a control unit of a motor vehicle. During normal use of the motor vehicle a management program of the control unit of the engine can write in a memory all the errors identified. At each verification of the motor vehicle by the mechanic (for example, in the case of the periodic servicing coupons), the data with the errors can be downloaded and sent to the code editors, i.e., the programming staff, or applications for automatic generation and/or updating of software, of the design centre for correction of the errors. On the same occasion, the program of the control unit would be updated with the new debugged version identified thanks to other run-time tests conducted on other motor vehicles. In this way, in a short time many errors would be identified, also rendering the motor vehicles safer. The same process could be used in the case of other vehicles controlled by control units, such as aeroplanes, trains, and ships.

Another example of application of the present process is in the case of programs for control of mobile communication apparatuses, for example, mobile telephones of a cellphone type. During operation of said apparatuses, in the case of errors, an SMS (Short Message System) message, an e-mail message, or other data or voice message that can be sent from the mobile telephone could be sent to the network manager and/or directly to the code editors.

Another example of application of the present process is represented by the case of programs for consumer electronics and for operating systems.

Since the process according to the invention is of general application, it can be used for all the programs written in C/C++ language or in languages in which there are structures similar to those on which the syntactic analysis of the process according to the invention operates.

The invention claimed is:

1. A process for verifying errors in computer codes in C/C++ language in a computer, which comprises the operations of:
   making available in said computer a source computer program (P) containing computer codes in C/C++ language;
   compiling (Z) said source computer program (P) to obtain an executable program (E); and
   executing (240) said executable program (E) to generate (245) an error report (R);
   wherein said process comprises prior to the operation of compilation (Z):
   executing an operation of syntactic analysis (AS) to identify variables (x) having a vector or pointer structure; and
   modifying said source computer program (P) via the application to said identified variables (x) of a test function (f( . . . ); io_sper; io_sper2; io_sper3; io_sper4) that is able to verify, during the operation of execution, whether an index (y) supplied for said variable x is valid,
   replacing (230) in said
   identified variables (x) codes of said source program (P) with codes created by said operation of syntactic analysis (AS) by encapsulating said test function (f( . . . ); io sper; io sper2; io sper3; io sper4) in said variable, substituting the index (y) of the variable (x) with said test function (f( . . . ); io sper; io sper2; io sper3; io sper4).

2. The process according to claim 1, wherein said operation of identifying comprises identifying variables (x) distinguished by square brackets.

3. The process according to claim 1, wherein the process comprises an operation (210) of creation of a copy of a project (D) to which said source program (P) is associated.

4. The process according to claim 3, wherein the process comprises adding (220), to the copy of the project (D), an object file (OF) that contains the test functions to be introduced, and generating a new project (D').

5. The process according to claim 4, wherein said adding operation (220) also comprises inserting an interfacing module visible to the programmer (IF; ErrorFunction; ErrorFunction2).

6. The process according to claim 5, wherein, whenever the test function (io_sper; io_sper2) identifies an error, it calls said interfacing module (IF; ErrorFunction; ErrorFunction2).

7. The process according to claim 1, wherein the process comprises an operation (250) of verification of errors in said report (R) and an operation (260) of correction of the errors in the project (D).

8. The process according to claim 1, wherein said test function (f( . . . ); io_sper; io_sper2; io_sper3) that is able to verify, during the operation of execution, whether an index (y) supplied for said variable (x) is valid comprises executing an operation of control of the indices that comprises evaluating a first value regarding the size of the variable (x)(sizeof(x)), evaluating a second value regarding the size of the individual element of the variable (sizeof(x[0]), and supplying a datum that indicates the size of the individual element, and making a division between said first value and said second value to obtain the number of elements that constitute the variable (x).

9. The process according to claim 8, wherein said operation of control of the indices comprises a step of comparison between an address (&x) of the variable (x) and an address of the individual element of the variable &x[0]), the variable (x) being identified as pointer in the case where said addresses are different.

10. The process according to claim 8, wherein the process comprises supplying to the test function (f( . . . ); io_sper; io_sper2; io_sper3; io_sper4) at least the following parameters:
   the variable (x);
   the address (&x) of the variable (x);
   the address &x[0] of the first element of the variable (x);
   the size (sizeof(x)) of the variable (x);
   the size sizeof(x[0] of the first element of the variable (x);
   the index (y) of the variable (x).

11. The process according to claim 8, wherein said test function (f( . . . ); io_sper; io_sper2; io_sper3; io_sper4) is able to execute the following verification steps on said variable (x):
   verifying that the variable (x) is not NULL;
   verifying whether the variable (x) is a pointer or a vector;
   in the case where the variable (x) is a vector, verifying that the index (y) is not negative in order to identify a condition of buffer underflow and that the index (y) does not exceed the limits of said vector in order to identify a condition of buffer overflow;
   in the case where the variable (x) is a pointer, verifying that the index of the pointer is not negative; otherwise, issuing a warning signal;
   and in that said test function f( . . . ) comprises returning the index with which is intended to indicize the vector.

12. The process according to claim 8, wherein said test function f( . . . ) is able to execute the following verification steps on said variable (x):
   verifying that the variable (x) is not NULL;
   verifying whether the variable (x) is a pointer or a vector;
   in the case where the variable (x) is a vector, verifying that the index (y) is not negative and that the index (y) does not exceed the limits of said vector; and
   in the case where the variable (x) is a pointer, creating a database (DBT) internal to said test function f( . . . ) that is able to verify, during the operation of execution, whether the index (y) supplied for said variable (x) is valid;
   and in that said test function (f( . . . )) comprises returning the index with which it is intended to indicize the vector.

13. The process according to claim 12, wherein said database (DBT) contains the addresses of start and end of variables allocated during the operation of the program.

14. The process according to claim 12, wherein said database (DBT) is dynamically variable in size during operation via the use of an operation of static allocation that comprises at least the steps of introducing, for each variable declared in the stack, a variable containing the information inherent thereto by means of said operation of syntactic analysis (AS) to identify variables (x) having a structure of vector or pointer.

15. The process according to claim 14, wherein said process of syntactic analysis (AS) envisages identifying an end of declaration of variables identifying the recurrence of braces "{ ... }".

16. The process according to claim 15, wherein the process envisages allocating, at each open brace "{", a vector (V) of data structures (struct SInfoVect_s) containing as many elements as are the variables allocated up to the closing of the corresponding area of management ("}").

17. The process according to claim 15, wherein said vector (V) is inserted within a higher structure (SInfoSupp_s) compresed in said database (DBT), which points to the starting address of the variable.

18. The process according to claim 1, wherein said procedure of syntactic analysis (AS) envisages one or more of the following steps of analysis and syntactic transformation executed on the source program (P):
removal of the comments;
removal of superfluous round brackets;
replacement of the string ")→" with "+0)→";
subsequent removal of the superfluous round brackets;
removal of the space before and after the string "→";
replacemen of the string "→" with "[0]";
removal of the spaces in the names of the variables;
conversion of the dereferentiation of a pointer into a vector;
subsequent removal of the superfluous round brackets;
removal of unnecessary brackets in the names of variables;
insertion of a vector of the indices (io_index[ . . . ]); and
insertion of the test functions ((f . . . ); io_sper( . . . ), io_sper2( . . . ), io_sper3( . . . )).

19. The process according to claim 18, wherein, in the case of embedded applications, said test function (io_sper2) supplies at output an error report that indicates the variable (x) subjected to testing and the corresponding source program (P) subjected to testing via corresponding identifying values.

20. The process according to claim 19, wherein, in said test function (io_sper2) for embedded applications, the name of the file is identified with a numeric identifier, and the name of the vector under examination is supplied with a numeric identifier.

21. The process according to claim 1, wherein said test function (io_sper) supplies at output an error report (R) that indicates the variable (x) subjected to testing and the corresponding source program (P) subjected to testing.

22. The process according to claim 1, wherein the process is comprised in a process of production of a computer-program product run totally or partially on said computer.

23. The process according to claim 1, wherein the process comprises modifying only portions of code to create different versions of the same computer program, which subject different parts of code to testing.

24. The process according to claim 1, wherein the process is comprised in a management program of the control unit of a motor vehicle and in that said operation of generating (245) an error report (R) comprises writing in a memory errors identified during operation of the motor vehicle.

25. The process according to claim 1, wherein the process is comprised in a management program of a mobile communication apparatus, and said operation of generating (245) an error report (R) comprises sending a message of an SMS type and/or of an e-mail type and/or another message that can be sent by said mobile communication apparatus to the network manager and/or to code editors.

26. A process for creating a computer-program product, said process being executed totally or partially by means of a computer and comprising: editing portions of source code in C/C++ language by means of data-input peripherals of the processor; compiling said portions of source code in a lower-level language through microprocessor means and volatile-memory or mass-memory means of the processor; verifying the code compiled through microprocessor means and volatile-memory or mass-memory means of the processor; and generating a corresponding error report made available to the user via output peripherals of the processor, in particular display peripherals or data-printing peripherals, in order to introduce modifications to the editing of the portion of source code subjected to compilation, said process being wherein said operation of verifying the compiled code comprises the process of verification according to claim 1.

27. A system for verifying errors in computer codes in C/C++ language, said system being comprised in a computer and being configured for implementing the process according to claim 1.

28. A computer-program product loaded into the memory of at least one computer and comprises software code portion for implementing the process according to claim 1.

29. The system according to claim 27, wherein said computer is of an embedded type.

30. The system according to the claim 29, wherein said embedded computer is comprised in a motor-vehicle control unit.

31. The system according to claim 27, wherein said embedded computer is comprised in a mobile communication apparatus.

* * * * *